(12) United States Patent
Rungger et al.

(10) Patent No.: US 11,689,135 B2
(45) Date of Patent: Jun. 27, 2023

(54) AUTOMATICALLY DETERMINING CONTROL PARAMETERS FOR A VOLTAGE REGULATOR OF A SYNCHRONOUS MACHINE

(71) Applicant: ABB Schweiz AG, Baden (CH)

(72) Inventors: Matthias Rungger, Zürich (CH); Peter Al-Hokayem, Nussbaumen (CH); Fabian Streiff, Wallisellen (CH); Valerijs Knazkins, Oberrohrdorf (CH)

(73) Assignee: ABB Schweiz AG, Baden (CH)

( * ) Notice: Subject to any disclaimer, the term of this patent is extended or adjusted under 35 U.S.C. 154(b) by 27 days.

(21) Appl. No.: 17/616,462

(22) PCT Filed: Jun. 6, 2019

(86) PCT No.: PCT/EP2019/064887
§ 371 (c)(1),
(2) Date: Dec. 3, 2021

(87) PCT Pub. No.: WO2020/244769
PCT Pub. Date: Dec. 10, 2020

(65) Prior Publication Data
US 2022/0263445 A1 Aug. 18, 2022

(51) Int. Cl.
*H02P 23/14* (2006.01)
*H02P 25/022* (2016.01)

(52) U.S. Cl.
CPC ............ *H02P 23/14* (2013.01); *H02P 25/022* (2013.01)

(58) Field of Classification Search
CPC ........ H02P 23/14; H02P 25/022; H02P 9/102; H02P 25/03; G05B 11/42; G05B 13/045
USPC ............................................. 318/400.01, 700
See application file for complete search history.

(56) References Cited

U.S. PATENT DOCUMENTS

| 6,700,356 B1 | 3/2004 | Dorn et al. |
| 7,024,253 B2 | 4/2006 | Gaikwad et al. |

(Continued)

FOREIGN PATENT DOCUMENTS

| EP | 0263616 A2 | 4/1988 |
| EP | 2245732 B1 | 11/2010 |

(Continued)

OTHER PUBLICATIONS

K. Kim, et al., "Self-Tuning of the PID Controller for a Digital Excitation Control System," IEEE Transactions on Industry Applications, pp. 1518-1524, 2010.

(Continued)

*Primary Examiner* — David Luo
(74) *Attorney, Agent, or Firm* — Armstrong Teasdale LLP (57) ABSTRACT

A synchronous machine includes a stator with stator windings connected with stator terminals to an electrical grid and a rotor with rotor windings rotatable mounted in the stator, wherein a voltage regulator of the synchronous machine is adapted for outputting an excitation signal to adjust a current in the rotor windings for controlling the synchronous machine. A method for determining control parameters for the voltage regulator includes (i) receiving a first time series of values of the excitation signal and a second time series of measurement values of the terminal voltage in the stator terminals, (ii) determining coefficients of a system transfer function of the synchronous machine, and (iii) determining the control parameters for the voltage regulator from the coefficients of the system transfer function.

15 Claims, 2 Drawing Sheets

(56) References Cited

U.S. PATENT DOCUMENTS

| | | |
|---|---|---|
| 8,275,488 B2 | 9/2012 | Kim et al. |
| 9,766,055 B2 * | 9/2017 | Baumann ................ B60L 15/20 |
| 2002/0040250 A1 | 4/2002 | Gaikwad et al. |
| 2009/0195224 A1 | 8/2009 | Kim |

FOREIGN PATENT DOCUMENTS

| | | |
|---|---|---|
| WO | 2004059400 A1 | 7/2004 |
| WO | 2009097605 A1 | 8/2009 |

OTHER PUBLICATIONS

K. Kim, et al., "Tuning a PID controller for a digital excitation control system," IEEE Transactions on Industry Applications, vol. 41, pp. 485-492, 2005.
L.Z. Gaing, "A particle swarm optimization approach for optimum design of PID controller in AVR system," IEEE Transactions on Energy Conversion, 2004.
G. Fusco, et al., "Adaptive voltage regulator design for synchronous generator," IEEE Transactions on Energy Conversion, pp. 946-956, 2008.
L. Ren, et al., "Nonlinear identification and control of a turbogenerator—an on-line scheduled multiple model/controller approach," IEEE Transactions on Energy Conversion, vol. 20, pp. 237-245, 2005.
International Search Report and Written Opinion for corresponding International App. No. PCT/EP2019/064887, dated Mar. 9, 2020, 13 pages.

* cited by examiner

AUTOMATICALLY DETERMINING CONTROL PARAMETERS FOR A VOLTAGE REGULATOR OF A SYNCHRONOUS MACHINE

CROSS-REFERENCE TO RELATED APPLICATIONS

The present disclosure is a national stage application of International Patent Application No. PCT/EP2019/064887, filed on Jun. 6, 2019, the disclosure of which is hereby incorporated by reference in its entirety.

FIELD OF THE DISCLOSURE

The disclosure relates to the field of synchronous electrical machines. In particular, the disclosure relates to a method, a computer program and a computer-readable medium for determining control parameters for a voltage regulator of a synchronous electrical machines as well as to a synchronous electrical machines with such a voltage regulator.

BACKGROUND

An automatic voltage regulator, which regulates the magnitude of a three phase alternating voltage at the terminals of a synchronous generator, whose field windings are possibly energized by an exciter machine, usually include a PID controller. The control parameters of the PID controller may have to be adjusted during commissioning of the synchronous generator.

In order to simplify the commissioning procedure of synchronous generators, auto-tuning methods have been developed to automatically determine the control parameters from data and high-level specifications. The available procedures roughly proceed in three steps. Firstly, the system is excited and the terminal voltage together with the excitation signal, e.g. the field voltage, is recorded. Secondly, a transfer function model of the small-signal behavior of the system around the given operating point is identified using the recorded data. Thirdly, the transfer function model is used to compute the parameters of the regulator.

Unfortunately, the currently available methods to identify the transfer function model in the second step may be problematic. For example, a least squares approach may lead to biased control parameter estimates so that the model quality may suffer. It is also known to use a particle swarm optimization. However, a particle swarm optimization method may lead to imprecise parameter estimates, potentially requires a large number of solutions of initial value problems and requires expert knowledge to tune the parameters of the algorithm, e.g. number of particles, parameters in the sample update rule.

It also may be that the available methods to compute the control parameters in the third step are problematic. The methods to compute the control parameters may be either quite restrictive with respect to the achievable controller performance or may result again in a tedious time consuming trial-and-error approach.

WO 2009/097 605 A1 describes a digital excitation control system, in which a transfer function model is determined with a least square method and the control parameters are derived therefrom with pole zero cancellation.

BRIEF DESCRIPTION OF THE DISCLOSURE

It is an objective of the disclosure to determine control parameters of an automatic voltage regulator for a synchronous machine in an easy to use and automatic way.

This objective is achieved by the subject-matter of the independent claims. Further exemplary embodiments are evident from the dependent claims and the following description.

An aspect of the disclosure relates to a method for determining control parameters for a voltage regulator of a synchronous machine. With the method control parameters of an automatic voltage regulator may be automatically computed. The voltage regulator may be used to regulate an magnitude of a three-phase alternating terminal voltage of a synchronous generator at a desired level.

The synchronous machine may include a stator with stator windings connected with stator terminals to an electrical grid and a rotor with rotor windings rotatable mounted in the stator. The (automatic) voltage regulator may be adapted for outputting an excitation signal to adjust a current in the rotor windings for controlling the synchronous machine, such that a terminal voltage in the stator terminals is controlled. For example, the excitation signal may be a voltage signal applied to the rotor windings themselves or a voltage signal applied to an exciting system which is coupled to the rotor.

With the voltage regulator a terminal voltage in the stator terminals may be adjusted and/or controlled. Further control objectives of the voltage regulator may be the reactive power and/or the power factor of the synchronous machine.

The method may be automatically performed by a controller, which may be part of the voltage regulator. The control parameters may be parameter of a further controller and/or control part of the voltage regulator.

With the method, the control parameters may be determined in three steps.

According to an embodiment of the disclosure, the method includes: in a first step, receiving a first time series of values of the excitation signal and a second time series of measurement values of the terminal voltage, wherein the first time series and the second time series acquired over a time interval. Firstly, the synchronous machine, such as a generator, may be excited, possibly through an exciter system. For example, the synchronous machine may be excited at a fixed operating point and the terminal voltage together with the excitation signal may be recorded. The first and second time series may include values acquired at consecutive and/or equally distant time instant.

According to an embodiment of the disclosure, the method includes: in a second step, determining coefficients of a system transfer function of the synchronous machine, wherein the system transfer function is a rational function, wherein the coefficients of the system transfer function are determined recursively with a regression analysis with instrumental variables. In the regression analysis, the first time series may be considered as system input and the second time series may be considered as system output.

The system transfer function, as well as the other transfer functions mentioned below, may be provided in the Laplace transformed system. It may be that the first and second time series are Laplace transformed before they are input into the regression analysis.

For example, the simply refined instrumental variable method may be used. With the instrumental variable method a continuous-time transfer function may be identified. The system transfer function may be determined for the small-signal behavior of the system around a given operating point using the recorded data from the first step.

The instrumental variable method may not lead to biased parameter estimates like an (recursive) least squares approach. Furthermore, it may not require expert knowledge in manually tuning the algorithm. Moreover, the instrumental variable method may require only a few solutions of initial value problems to find the coefficients of the system transfer function. For example, less than 25 initial value problems may have to be solved until the algorithm terminates.

According to an embodiment of the disclosure, the method includes: in a third step, determining the control parameters for the voltage regulator from the coefficients of the system transfer function by comparing a closed loop transfer function formed of a controller transfer function of the voltage regulator and the system transfer function with a desired closed loop transfer function.

The controller transfer function may be the transfer function of a controller of the voltage regulator for which the control coefficients are determined. Therefore, the controller transfer function may depend on the controller parameters. From the controller transfer function and the system transfer function an open loop transfer function may be determined, for example by multiplying the two transfer function. From the open loop transfer function, the closed loop transfer function may be determined. In the end, one may assume that the closed loop transfer function is equal to a desired closed loop transfer function with known coefficients, such as transfer function of a first order or second order system. For example, the desired coefficients of the desired transfer function may be a desired settling time and/or a desired overshoot. From this, the control parameter can be computed from the desired coefficients of the desired closed loop transfer function and the coefficients of the system transfer function.

According to an embodiment of the disclosure, in the regression analysis with instrumental variables the coefficients of the system transfer function are recursively determined by: calculating an actual step excitation signal by filtering the previous step excitation signal with a denominator of the system transfer function with actual step coefficients, and calculating an actual step terminal voltage by filtering a previous step terminal voltage with the denominator of the system transfer function with actual step coefficients.

As already mentioned, all these functions and signals may be evaluated in the Laplace domain. In particular, higher order derivatives of the excitation signal and the terminal voltage may be determined by multiplying with a correspondingly exponentiated Laplace variable. For the excitation signal, all derivatives up to the order n−1 of the denominator and/or for the terminal voltage all derivatives up to the order m of the numerator of the system transfer function may be determined.

According to an embodiment of the disclosure, in the regression analysis with instrumental variables the coefficients of the system transfer function are recursively determined by: calculating an actual step response by filtering the first time series of measurement values of the excitation signal with the system transfer function with actual step coefficients; and determining next step coefficients by minimizing a difference between a $n^{th}$ derivative of the actual step terminal voltage and a product of a coefficient vector and an instrumental variable vector. As already mentioned, n is the order of denominator of the system transfer function.

The coefficient vector may be formed of the next step coefficients. Note that there are n+m−1 such coefficients, i.e. m for the numerator and n−1 for the denominator.

The instrumental variable vector is formed from the n−1 derivatives of the actual step response and the m derivatives of the actual step excitation signal.

According to an embodiment of the disclosure, the method further includes: forming an initial step excitation signal by filtering the first time series of measurement values of the excitation signal with a high pass filter; and/or forming an initial step terminal voltage by filtering the second time series of measurement values of the terminal voltage with the high pass filter. Filtering may be performed in the Laplace domain by multiplying a filter factor. The filter factor may be an exponentiated fraction of a cutoff frequency divided by the cuttoff frequency plus the Laplace variable. The filter factor may be exponentiated by n+1.

According to an embodiment of the disclosure, the method further includes: determining initial step coefficients for the system transfer function by minimizing a $n^{th}$ derivative of an initial step terminal voltage and a product of a coefficient vector and a regression vector, wherein the coefficient vector is formed of the initial step coefficients and the regression vector is formed from the n−1 derivatives of the initial step terminal voltage and the m derivatives of an initial step excitation signal.

The initial step signals may be determined by Laplace transforming the respective time series. The derivatives of these signals than may be determined by multiplying the correspondingly exponentiated Laplace variable. Also a filter factor may be multiplied as described above.

In the third step, the control parameter computation may be based on a pole-zero cancellation procedure, in which the poles and/or zeros of a resulting closed loop transfer function are matche3d to the poles and/or zeros of a desired closed loop transfer function. In particular, a pole cancellation procedure may be applied that enforces a desired settling time and/or overshoot. In one variation, the also a desired steady-state error may be used as desired parameter.

In such a way, no mapping of closed-loop poles to time domain behaviour may be needed and/or no tuning of objective functions and algorithms may be required. The desired settings, i.e., the settling time, the overshoot, and possibly the steady state error, which is enforced in the closed-loop, is straightforward to interpret by a commissioning engineer and any tedious and time-consuming indirect parameter tuning is avoided.

According to an embodiment of the disclosure, the desired closed loop transfer function is a second order transfer function, for example with a desired settling time and/or a desired overshoot. In such a way, the performance of the closed-loop need not be restricted to a first order system.

According to an embodiment of the disclosure, the desired closed loop transfer function is a first order transfer function, for example with a desired settling time. As already mention, also a first order transfer function may be used for determining the control parameters. In general, also higher order transfer functions may be possible.

According to an embodiment of the disclosure, the controller transfer function is a transfer function of a PID controller. A PID controller may include a proportional controller part, an integral control part and a differential controller part. The control parameters may be the factors of these parts or the factors for these parts may depend on the control parameters. It may be that the control parameters set factors for a proportional controller part, an integral control part and a differential controller part.

According to an embodiment of the disclosure, a desired steady state error is set by comparing the closed loop transfer function and the controller transfer function. For a controller, which does not automatically force a steady state error to 0, a maximal magnitude of this error also may be used as setting for fixing the control parameters.

According to an embodiment of the disclosure, the controller transfer function is a transfer function of a lead-lag controller. Such a transfer function may include at least two factors, wherein each factor has a pole and a zero. For the one factor the pole may be at a higher position as the zero and for the other factor, the pole may be lower as the zero.

Furthermore, a lead-lag controller need not regulate the steady state error automatically to zero. In such a way, a lead-lag controller may have at least four control parameters, which may be determined, such that a desired settling time, a desired overshoot and a desired steady state error are achieved.

According to an embodiment of the disclosure, the method further includes: generating a voltage to be applied to the rotor windings by generating the first time series of values of the excitation signal and applying the first time series to the synchronous machine; and measuring the second time series of the terminal voltage. For example, the first time series may have a special form, such as a specific step function or a random signal. It also may be that the first time series is determined during a regular operation of the synchronous machine system, i.e. that the first time series is generated by the voltage regulator with another set of control parameters.

According to an embodiment of the disclosure, the control parameters are determined during a commissioning of the synchronous machine. It may be that method is performed once, when the synchronous machine is installed. After that, the once determined control parameters may be used during the operation of the synchronous machine.

According to an embodiment of the disclosure, the control parameters are determined periodically during a continuous operation of the synchronous machine. In this case, the first and second time series may be determined in regular intervals and the control parameters may be determined therefrom. In other words, the determined control parameters may change over time. Note that in this case, the two time series may be determined during the operation of the synchronous machine system.

In general, the three-step procedure may be applied during the commissioning of the voltage regulator to determine the controller parameters once and/or periodically to update the control parameters, while the synchronous machine system is in operation.

A further aspect of the disclosure relates to a method for controlling the synchronous machine. The method not only may be used for setting and/or determining control parameters, but also for using the control parameters during operation of the synchronous machine.

The method for controlling the synchronous machine may include determining the control parameters as described in the above and in the below, applying the determined control parameters to the voltage regulator of the synchronous machine, in particular to a controller of the voltage regulator, and controlling a synchronous machine with the voltage regulator. In particular the synchronous machine may be controlled by regulating the terminal voltage with the voltage regulator.

A further aspect of the disclosure relates to a computer program for determining control parameters for a voltage regulator, which when being executed on a processor is adapted for performing the method as described in the above and the below.

A further aspect of the disclosure relates to a computer readable medium for determining control parameters for a voltage regulator in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

A further aspect of the disclosure relates to a controller of a voltage regulator of an synchronous machine, which controlled is adapted for performing the method as described in the above and the below. The controller may include a processor and a memory in which the computer program is stored. However, it also may be that the method is partially or completely implemented in hardware.

A further aspect of the disclosure relates to a synchronous machine system, which includes a synchronous machine with a stator having stator windings connected via terminals to an electrical grid and a rotor having rotor windings, which rotor is rotatable mounted in the stator, and a voltage regulator for supplying a voltage to the rotor windings. The voltage regulator may include an electrical converter, which is suppliable with electrical power from the electrical grid and which is adapted for generating the voltage for the rotor windings. The voltage regulator may also be supplied by a permanent magnet generator (PMG) and/or by a battery. Furthermore, the voltage regulator may include a controller for controlling the converter and for performing the method as described in the above and the below.

It has to be understood that features of the method as described in the above and in the following may be features of the synchronous machine system, the controller. the computer program and/or the computer readable medium as described in the above and in the following.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE DISCLOSURE

Figure 1:
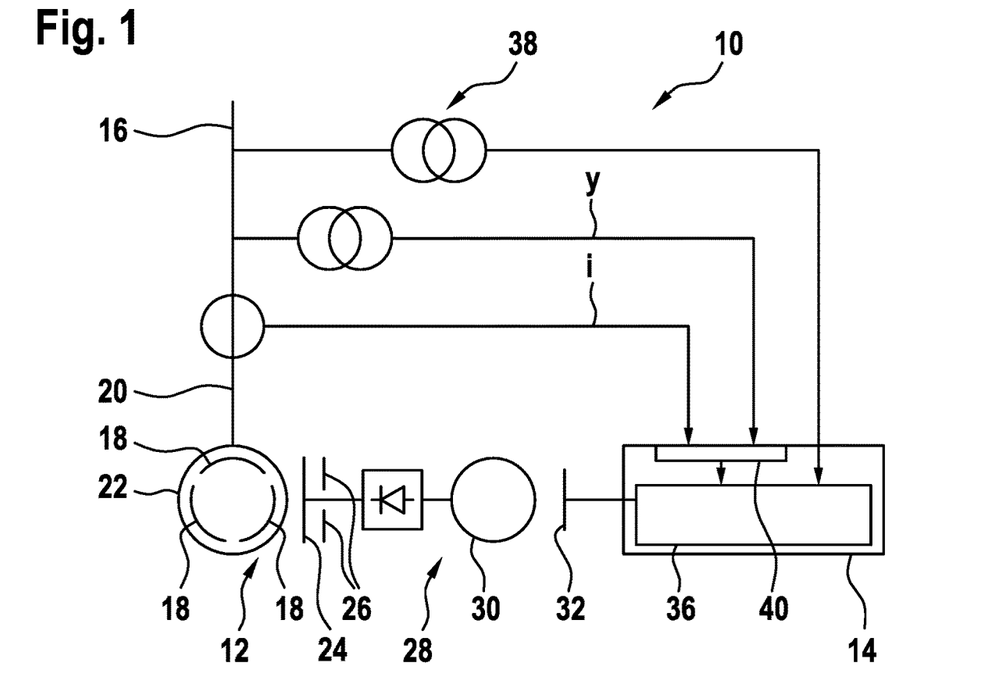
FIG. 1 schematically shows a synchronous machine system according to an embodiment of the disclosure.

FIG. 1 shows a synchronous machine system 10 with a synchronous machine 12 and a voltage regulator 14. The synchronous machine 12, such as a synchronous generator and/or synchronous motor, is connected to an electrical grid 16 via its stator windings 18 and in particular the stator terminal 20. The stator windings are mounted to the stator 22 of the synchronous machine 12 and a rotor 24 of the synchronous machine 12 is rotatable mounted in the stator 20 and carries rotor windings 26, which are supplied by the voltage regulator 14.

As shown in FIG. 1, the rotor windings 26 may be supplied by an exciter system 28, which includes exciter windings 30 rotating with the rotor 24 and supplied by static voltage regulator windings 32 electrically connected to the voltage regulator 14. A voltage from the voltage regulator 14 induces a voltage in the exciter windings 30, which is rectified with a exciter rectifier 34 and supplied to the rotor windings 26.

The voltage regulator 14 includes a converter 36, which is supplied via a transformer 38 connected to the electrical grid 16. A controller 40, which measures a terminal voltage y and a terminal current i in the terminals 20 of the synchronous machine 12 controls the converter 36.

For example, a synchronous generator 12 may contribute to an electrical power in the electrical grid 16 by transforming mechanical energy to electrical energy. The mechanical energy may be supplied by steam turbines, gas turbines or water turbines. The turbines may power the rotor 24 of the synchronous generator 12, which holds a magnetic field, which is generated by a current that flows through the rotor winding 26, such as a coil of wires attached to the rotor 24. The rotational motion of the magnetic field on the rotor 24 relative to the stator windings 18, such as coils of wires that are mounted on the stator 22, induces a voltage in the stator windings 18. Usually, three stator windings 18 are geometrically mounted on the stator 22 so that under steady state conditions the induced voltages y measured at the terminals 20 of the stator windings 18 result in three sinusoidal waveforms with identical amplitude and frequency, phase-shifted by 120 degrees. The frequency and the amplitude of the terminal voltages y is mainly influenced by the angular velocity of the rotor 24 and the intensity of the field current, respectively.

A stable operation of the electrical grid 16 may require that the magnitude of the (usually three-phase) terminal voltage y of the synchronous generator 12 is almost constant and deviates only little from a given desired value. However, the terminal voltage y of a grid-connected generator 12 may non-locally depend on all other entities present in the electrical grid 16, such as electrical loads, renewable power sources, other generators, and may deviate substantially from its desired waveform. Hence, it may be necessary to regulate the magnitude and frequency of the terminal voltage y to a desired values by adequately adjusting the field current and rotor velocity, respectively. Often, the current in the rotor windings 26 is provided by an exciter system 28, which may be seen as second generator 30, 32. Since the windings 30 of the exciter system 28 may be connected through the rectifier 34 to the rotor windings 26 of the synchronous generator 12, the magnitude of the terminal voltage y of the synchronous generator 12 may be regulated through the manipulation of field current of the exciter system 28.

The (automatic) voltage regulator (AVR) 14 is used to regulate the actual magnitude of the terminal voltage y(t) of the synchronous machine 12. In general, its output is either connected directly to the rotor windings 26 of the synchronous machine 12, or to the windings 32 of the exciter system 28. The output signal $u_{avr}(t)$ of the voltage regulator 14 may be determined based on the error e(t)=r(t)−y(t) between the desired magnitude of the terminal voltage r(t) and the measured magnitude of the terminal voltage y(t).

For example, in the case of a PID controller, the output signal may include three terms $$u_{avr}(t) = k_p e(t) + k_i \int_0^t e(s)ds + k_d \frac{d}{dt} e(t)$$

The output of the voltage regulator 14 may be formed through a linear combination of the error, the integral of the error and derivative of the error. The constant coefficients $k_p$, $k_i$ and $k_d$ of the linear combination may be called controller parameters or controller gains. The control parameters influence the performance of a closed-loop formed by the dynamical system including the voltage regulator 14, the synchronous machine 12 possibly including an exciter system 28.

Figure 2:
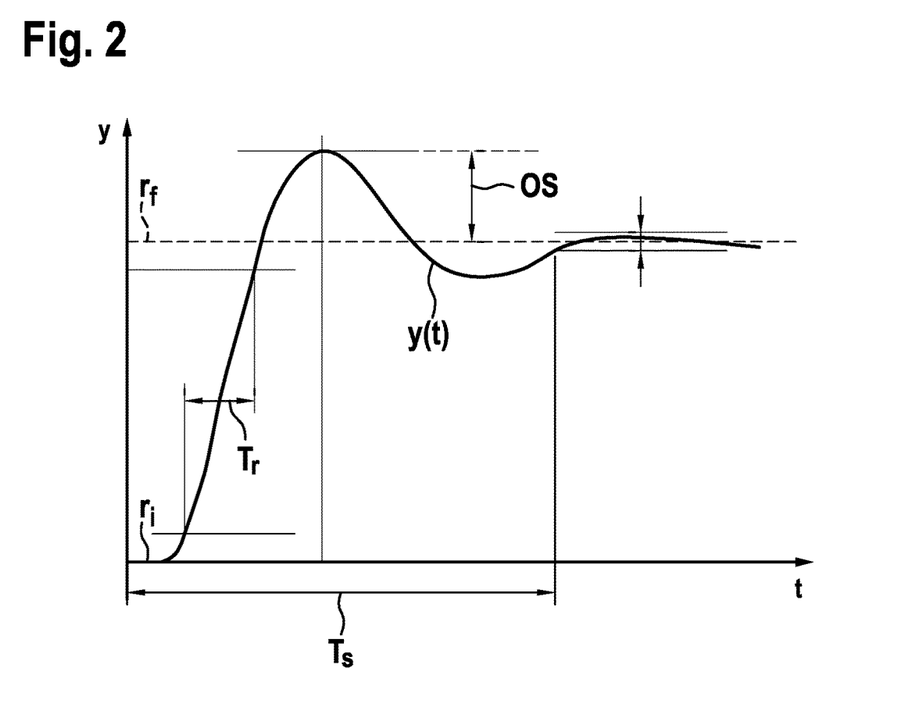
FIG. 2 shows a diagram with a response function used for controlling the system of FIG. 1.

FIG. 2 shows a diagram with an example of the actual magnitude of the terminal voltage $y_m(t)$ during a step from an initial desired value $r_i$ to a final desired value $r_f$ under the control of the controller 40, which is usually called step response.

Furthermore, FIG. 2 shows performance indices for the step response. In general, it may be desirable that the closed-loop reacts quickly to changes in the reference signal so that the actual magnitude of the terminal voltage y(t) approaches the new desired value $r_f$ as fast as possible. The rise time $T_r$, the settling time $T_s$, and the overshoot OS associated with a step response may be used as controller performance indices. For example, the rise time $T_r$ may refer to the time interval in that the magnitude of the terminal voltage y(t) requires to increase from 10% to 90% of the reference step between the initial desired value $r_i$ and the final desired value $r_f$. The settling time $T_s$ may refer to the time interval from the moment when the reference step occurs until y(t) stays within the +2% of r(t). The overshoot OS may refer to the maximal excess of y(t) over the final desired value $r_f$ and/or may be stated in %, such as $OS = _{t>0}^{max}(y(t)-r(t))/r(t)$.

The form of the curve of terminal voltage y(t) with the settling time $T_s$ and the overshoot OS is typical for a second order system. Below, it will be assumed that the closed loop composed of the controller 40 and the synchronous machine 12 is a second order system for setting the control parameters of the controller 30 to achieve specific values of the settling time $T_s$ and the overshoot OS.

Figure 3:
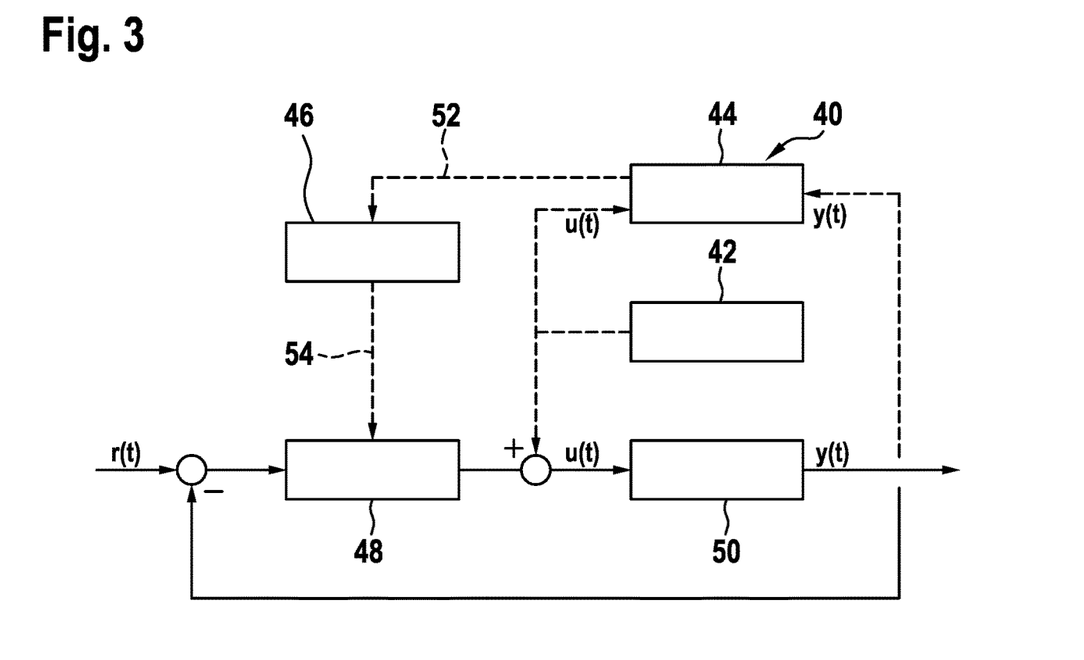
FIG. 3 schematically shows a block diagram of parts of the system of FIG. 1 including a controller according to an embodiment of the disclosure.
Figure 4:
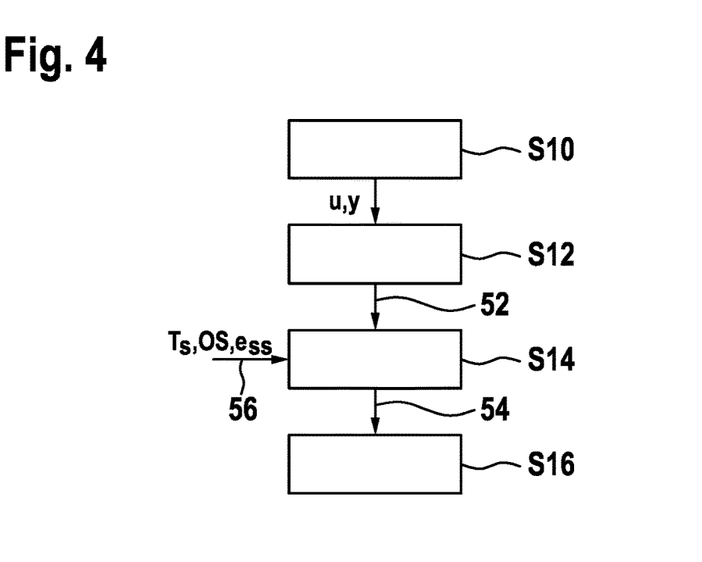
FIG. 4 shows a flow diagram for a method for determining control parameters for a voltage regulator according to an embodiment of the disclosure.

FIG. 3 shows a block diagram with controller parts 42, 44, 44, 48 of the controller 40 and a block 50 illustrating the parts of the system 10, such as the synchronous machine 12 and the exciter system 28 reacting on the exciter signal u(t) of the controller 40. FIG. 4 shows a flow diagram for a method that may be performed by the controller parts 42, 44, 44, 48.

In step S10, the system including synchronous machine 12 and optionally the exciter system 28, is excited over a certain time interval [0, T] and two time series of signals, the exciter signal $u_c$, such as a voltage applied to the windings 32 or 26, and the magnitude of the terminal voltage $y_m$, may be recorded with a certain sampling time h.

For example, the excitation signal u may be generated by a signal generator 42 and/or may be either a step-signal or a pseudo-random binary signal. The signal generator 42 may generate a voltage to be applied to the rotor windings by generating the first time series of values of the excitation signal u and applying them to the synchronous machine 12.

However, it also may be that the excitation signal $u_c$ is generated by the controller 48, i.e. during operation of the synchronous machine 12.

The second time series of may be determined by measuring the terminal voltage $y_m$.

The first time series of values of the excitation signal u and a second time series of measurement values of the terminal voltage y may then be received in the system identification block 40.

In step S12, the system identificator 44 determines coefficients 52 of a system transfer function G(s) of the system indicated by block 50. The system trans transfer function G(s) is a rational function in the Laplace variable s.

$$G(s) = \frac{b_0 s^m + b_1 s^{m-1} + \cdots + b_m}{s^n + a_1 s^{n-1} + \cdots + a_n}, \; n \geq m$$

In general, the coefficients $b_0, \ldots, b_m b_0, \ldots, b_m$, $a_1, \ldots, a_n$ (indicated as reference numeral 52 in FIGS. 3 and 4) of the system transfer function G(s) are determined recursively with a regression analysis with instrumental variables based on the first time series as system input and the second time series as system output, as will be explained in the following.

Depending on the particular application the model structure (n, m), i.e., the order of the numerator m and the order of the denominator n, may vary. In a typical application, in which the windings 26 of the synchronous machine 12 is energized by an exciter system 28 and the small signal behaviour of the terminal voltage y while the synchronous machine 12 is disconnected from the electrical grid 16, is of interest, the structure may be fixed to (2,1). By increasing the denominator order, it also may be possible to take the dynamics of a sensor into account in order to obtain a better fitting model. Similarly, (n, m) may be be adapted to different situations, e.g. when the winding 26 of the synchronous machine 12 is energized by a static excitation system.

Simply Refined Instrumental Variable Method

The simply refined instrumental variable (SRIV) approach may be used to compute the coefficients 52, $b_0, \ldots, b_m, a_1, \ldots, a_n$ of the system transfer function G(s) to model the small-signal behaviour of the system 50 including the synchronous machine 12 and possibly the exciter system 28.

The basis of the computation is the data set (u, y)

where u and y are the discrete-time signals that map from a discrete interval {1,2, . . . , T} to the real numbers. Here, y is the measured magnitude of the terminal voltage and u is the voltage of the winding 26, 32 either of the synchronous machine 12 or of the exciter system 28. The constant h is the sampling time with which the signals are recorded. The data can be collected either by exciting the system by a reference step or by applying a pseudo-random binary signal to the field winding voltage.

Subsequently, we refer to the coefficients 52, by coefficient vector $\theta = (a_1, \ldots, a_n, b_0, \ldots, b_m)^T$ and use $u_c$ and $y_c$ to denote the continuous-time signals obtained from a zero-order hold interpolation of the signals u and y, respectively. The parameters $\theta$ are computed iteratively.

Initial Parameter Computation

Note that in the following all signals have been Laplace transformed. Initially, the signals $u_c$ and $y_c$ are filtered with a filter with cut-off frequency $\lambda = 10/(2\pi h)$ $$\frac{\lambda^{n+1}}{(s+\lambda)^{n+1}}.$$

Specifically, the following filter responses are computed for $i \in \{1, \ldots, n\}$, $j \in \{0, \ldots, m\}$ with $y_f = y_c$ and $u_f = u_c$ $$u_f^{(j)} = s^j \cdot \frac{\lambda^{n+1}}{(s+\lambda)^{n+1}} u_f$$

$$y_f^{(i)} = s^i \cdot \frac{\lambda^{n+1}}{(s+\lambda)^{n+1}} y_f$$

An initial step excitation signal $u_f$ may be formed by filtering the first time series of measurement values of the excitation signal u with a high pass filter and/or an initial step terminal voltage yf may be formed by filtering the second time series of measurement values of the terminal voltage y with the high pass filter.

If $y_f^{(i)}$ were the derivative of $y_f$ and $y_f$ was the response of G(s) to $u_f$, then the following equation would be satisfied for all $t \in [0, h(T-1)]$ $$y_f^{(n)}(t) = -a_1 y_f^{(n-1)}(t) - \ldots - a_n y_f(t) + b_0 u_f^{(m)} + \ldots + b_m u_f(t) y_f^{(n)}(t)$$

Using the regression vector $$\varphi^T(t) = (-y_f^{(n-1)}(t), \ldots, -y_f(t), u_f^{(m)}, \ldots u_f(t))$$

It follows that $y_f^{(n)}(t) = \varphi^T(t)\theta$. The initial parameter estimate follows by minimizing the deviation of $y_f^{(n)}(t)$ from $\varphi^T(t)\theta$ summarized over the sampling times $t_i = (i-1)h$ with $i \in \{1, \ldots, T\}$. The objective function follows by $$\Sigma_{i=1}^T |y_f^{(n)}(t_i) - \varphi^T(t_i)\theta|^2$$

In general, initial step coefficients $\theta_0$ for the system transfer function G(s) may be obtained by minimizing the $n^{th}$ derivative of the initial step terminal voltage $y_f$ and a product of the coefficient vector $\theta_0$ and the regression vector $\varphi^T$, wherein the coefficient vector is formed of the initial step coefficients and regression vector is formed from derivatives of the initial step terminal voltage y and an initial step excitation signal u.

The initial step coefficients $\theta_0$ may be explicitly computed by $$\theta_0 = (\Sigma_{i=1}^T \varphi(t_i)\varphi^T(t_i))^{-1} \Sigma_{i=1}^T \varphi(t_i) y_f^{(n)}(t_i).$$

Parameter Update

In the parameter update procedure, the initialization procedure is essentially repeated and the coefficients $\theta$ are determined reclusively. However, there are two significant differences. First, the filter to compute the higher-order derivatives is given by the denominator of the system transfer function $$G(s) = \frac{B(s, \theta_k)}{A(s, \theta_k)} = \frac{b_0^k s^m + b_1^k s^{m-1} + \cdots + b_m}{s^n + a_1^k s^{n-1} + \cdots + a_n^k}.$$

Here, $$\theta_k = (a_1^k, \ldots a_n^k, b_0^k, \ldots, b_m^k)^T$$

are the coefficients 52 in the actual iteration k. Now, the filter responses are computed by $$u_f^{(j)} = \frac{s^j}{A(s, \theta_k)} u_f$$

$$y_f^{(i)} = \frac{s^i}{A(s, \theta_k)} y_f.$$

The actual step excitation signal $u_f$ is calculated by filtering the previous step excitation signal $u_f$ with the denominator A of the system transfer function G(s) with actual step coefficients $\theta_k$. Analogously, the actual step terminal voltage $y_f$ is calculated by by filtering the previous step terminal voltage $y_f$ with the denominator A with the actual step coefficients $\theta_k$.

The second difference stems from the use of instrumental variables in the computation of the coefficient update. To this end, the system transfer function G(s) is used to compute a noise-free response $$x(t) = \frac{B(s, \theta_k)}{A(s, \theta_k)} u_c(t).$$

The actual step response x is calculated ny by filtering the first time series of measurement values $u_c$ of the excitation signal with the system transfer function G(s) with actual step coefficients $\theta_k$.

Subsequently, the derivatives $i \in \{1, \ldots, n-1\}$ of x are computed by $$x_f^{(i)} = \frac{s^i}{A(s, \theta_k)} x.$$

and the instrumental variable vector $$\zeta^T(t) = (-x_f^{(n-1)}(t), \ldots, -x_f(t), u_f^{(m)}(t), \ldots, u_f(t))$$

is defined.

The next step coefficients $\theta_{k+1}$ may be determined by minimizing a difference between a $n^{th}$ derivative of the actual step terminal voltage $y_f$ and a product of the coefficient vector $\theta_k$ and the instrumental variable vector $\zeta^T$. The instrumental variable vector $\zeta_T$ is formed from derivatives of the actual step response x and the actual step excitation signal $u_f$.

In particular, the next step coefficients $\theta_{k+1}$ can be computed by $$\theta_{k+1} = (\Sigma_{i=1}^T \zeta(t_i) \varphi^T(t_i))^{-1} \Sigma_{i=1}^T \zeta(t_i) y_f^{(n-1)}(t_i).$$

The iteration may be repeated until $|\theta_{k+1} - \theta_k|$ is sufficiently small and/or smaller as a threshold, e.g. less than 0.01, or the number of iterations exceed a specific number, such as 10.

Note that the method is tuning free, i.e., given the data set (u, y), there are essentially no parameters that influence the outcome of the computation.

Moreover, the filter responses $y_f^{(i)}$, $i \in \{1, \ldots n, \}$ are computed at once for all $i \in \{1, \ldots, n\}$ by solving one initial value problem. A similar comment applies to $u_f^{(j)}$ and $x_f^{(i)}$. Hence, to $u_f^{(j)}$ and $x_f^{(i)}$. Hence, to compute the filter responses, two initial value problems may have to be solved in the initial parameter computation and three initial value problems may have to be solved in each coefficient update iteration. For example, a fourth order Runge-Kutta scheme with fixed step size may be used to solve the initial value problems.

Computation of Control Parameters

In step S14, the parameter computer 46 uses the coefficients 52 of the model G(s) together with further specifications 56 used to determine the control parameters 54.

In general, there exist a variety of methods to design a controller 48 with a controller transfer function C(s). In the following it is assumed that the system transfer model function has a structure with n=2 and m=1 and is of the form $$G(s) = \frac{K_p}{(T_1 s + 1)(T_2 s + 1)}.$$

It may happen that the identified transfer function G(s) has two complex conjugate poles and it is not possible to express G(s) with two real poles. In this case, we modify the coefficient $a_1$ of the denominator polynomial of G(s) by $\hat{a}_1 = \sqrt{1.5 \cdot 4 \cdot a_2}$ so that the modified transfer function $\hat{G}(s) = b_0/(s^2 + \hat{a}_1 s + a_2)$ is guaranteed to be representable with two real poles.

In particular, as explained below, a closed loop transfer function formed of a controller transfer function C(s) of the controller 48 and the system transfer function G(s) is compared with a desired closed loop transfer function, such as shown in FIG. 2, to determine the controller parameters 54.

In the following two embodiments for control parameters computation for two different controllers 48 are described. The first controller is a so-called series/cascaded PID controller. The second controller is a double lead-lag controller.

PID Controller Parameter Computation

The specifications 56 to compute the parameters of the PID controller are a desired settling time $T_s$ and a desired overshoot OS (see FIG. 2).

The transfer function of the PID controller 48 is given by $$C(s) = V_p \frac{1 + s T_a}{s T_a} \cdot \frac{K_b + (1 + K_b) T_b s}{K_b + T_b s}.$$

Note that the the control parameters $T_a$, $T_b$ and $K_b$ may be used to set the factors $k_p$, $k_i$ and $k_d$ for a proportional controller part, an integral control part and a differential controller part as described above.

The control parameters 54, $T_a$, $T_b$ and $K_b$ are determined so that the open loop transfer function, which is the product of the controller transfer function C(s) and the system transfer function G(s), results in $$C(s)G(s) = \frac{V_p K_p}{s T_1 (s \alpha T_2 + 1)}$$

where $\alpha \in ]0,1[$ is a parameter to be determined in a second step. Explicitly, the control parameters 54 are given by $$T_a = T_1, T_b = T_2(1-\alpha), \text{ and } K_b = (1-\alpha)/\alpha.$$

From the open loop transfer function, the closed-loop transfer function follows by $$\frac{V_p K_p}{s^2 T_1 T_2 \alpha + s T_1 + V_p K_p}.$$

This closed-loop transfer function is compared with a second order transfer function (see FIG. 2), where the standard form of the second order transfer function may be provided by $$\frac{\omega^2}{\omega^2 + 2\vartheta\omega s + s^2}$$

for which the heuristic $$\vartheta\omega \approx \begin{cases} 4T_s, & \vartheta \in ]0,1[ \\ 6T_s, & \vartheta \geq 1 \end{cases}$$

accurately relates the damping coefficient $\vartheta$ with the settling time $T_s$. By comparing the coefficients of the closed-loop and the standard form the second order transfer function, the parameters $$\alpha = \begin{cases} T_s/(8T_2), & \vartheta \in ]0,1[ \\ T_s/(12T_2), & \vartheta \geq 1 \end{cases}$$

and $$V_p = \frac{T_1}{4\vartheta^2 \alpha T_2} \cdot \frac{1}{K_p}.$$

cab be obtained. The damping coefficient $\vartheta$ may be derived from the overshoot specification OS. For OS>0, the damping coefficient follows by $$\vartheta = \frac{\ln(OS/100)}{\sqrt{\pi^2 + \ln^2(OS/100)}}$$

and $\vartheta = 1$ for OS=0. Note that the parameter a is restricted to the interval $]0,1[$. However, if the desired settling time $T_s$ is too large a might result in being greater than one. In this case, the desired settling time $T_s$ may be simply reduced so that $\alpha \in ]0,1[$.

Lead-Lag Controller Parameter Computation

The specifications 56 to compute the control parameters 54 of a lead-lag controller 48 are a desired settling time $T_s$, a desired overshoot OS and a desired steady state error $e_{ss}$.

The controller transfer function C(s) of the controller 48 is given by $$C(s) = K_R \frac{1 + sT_{C2}}{1 + sT_{B2}} \cdot \frac{1 + sT_{C1}}{1 + sT_{B1}}.$$

The numerator time constants of the controller are set to $$T_{C1} = T_1, T_{C2} = T_2$$

so that the open loop transfer function results in $$C(s)G(s) = \frac{K_R K_p}{(1 + sT_{B1})(1 + sT_{B2})}.$$

Let $T_{B1} = T$ and $T_{B2} = cT$, then the closed-loop follows by $$\frac{K_R K_p}{K_R K_p + 1 + s(c)T + s^2 cT^2}$$

The gain $K_R$ is chosen, so that desired steady state error $e_{ss}$ is enforced in the closed-loop, i.e., $$\frac{K_R K_p}{K_R K_p + 1} \leq e_{ss}/100.$$

The remaining parameters $T_{B1}$ and $T_{B2}$ (or equivalently c and T) may be chosen to enforce the desired settling time and overshoot in the transfer function $$\frac{K_R K_p}{K_R K_p + s(1+c)T + s^2 cT^2}$$

which closely approximates the actual closed-loop transfer function. In a first step, the damping coefficient $\vartheta$ is derived from the overshoot specification like the one of the PID controller. By comparing the coefficients with the standard form of the second order transfer function $$\frac{\omega^2}{\omega^2 + 2\vartheta\omega s + s^2}$$

It results that $$\vartheta\omega = \frac{1+c}{cT}, \omega^2 = \frac{K_R K_p}{cT^2}$$

By solving the equations for c, it follows that $$c = \frac{4K_R K_p \vartheta^2 - 1}{2} + \frac{((4K_R K_p \vartheta^2 - 1)^2 - 4)^{\frac{1}{2}}}{2}$$

In case that c would result in a complex number, the gain $K_R$ may be increased to ensure that c is real. The time constant T is determined by the settling time heuristic $$\frac{1+c}{cT} = \vartheta\omega \approx \begin{cases} 4T_s, & \vartheta \in ]0,1[ \\ 6T_s, & \vartheta \geq 1 \end{cases}$$

which results in $$T_{B2} = \frac{1+c}{c} \cdot \begin{cases} T_s/8, & \vartheta \in ]0,1[ \\ T_s/12, & \vartheta \geq 1 \end{cases}$$

and $$T_{B1} = cT_{B2}.$$

Control of Synchronous Machine

The three-step procedure for steps S10, S12, S14 may be applied during the commissioning of the voltage regulator 14 to determine the controller parameters 54 and/or periodically to update the controller parameters 54, while the system 10 is in operation. In this case, the data in step S10 may be obtained by measuring the desired signals u, y while the system 10 is operating.

After the steps S10, S12, S14, the control parameters 54 may be applied to the controller 48 of the voltage regulator 14.

In step S16, the controller 48 then may regulate the terminal voltage y towards a possibly time dependent reference signal r(t). The controller 48 may receive the reference signal r(t) and may control the magnitude of the terminal voltage $y_m(t)$ towards this reference signal r(t).

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practising the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 synchronous machine system
12 synchronous machine
14 voltage regulator
16 electrical grid
18 stator windings
20 stator terminal
22 stator
24 rotor
26 rotor windings
28 exciter system
30 exciter windings
32 voltage regulator windings
34 exciter rectifier
36 converter
38 transformer
40 controller
42 signal generator
44 system identification
46 parameter computation
48 voltage controller
50 block representing system
t time
y, y(t) magnitude of terminal voltage
$T_r$ rise time
$T_s$ settling time
OS overshoot
G(s) system transfer function
52 system transfer model coefficients
C(s) controller transfer function
54 control parameters
u, u(t) excitation signal
r(t) reference signal
56 specifications

The invention claimed is:

1. A method for determining control parameters for a voltage regulator of a synchronous machine, the synchronous machine comprising a stator with stator windings connected with stator terminals to an electrical grid, and a rotor with rotor windings rotatably mounted in the stator, wherein the voltage regulator is adapted for outputting an excitation signal to adjust a current in the rotor windings for controlling the synchronous machine, the method comprising:

receiving a first time series of values of the excitation signal and a second time series of measurement values of the terminal voltage in the stator terminals, wherein the first time series and the second time series are acquired over a time interval;

determining coefficients of a system transfer function of the synchronous machine, wherein the system transfer function is a rational function, wherein the coefficients of the system transfer function are determined recursively with a regression analysis with instrumental variables based on the first time series as system input and the second time series as system output; and determining the control parameters for the voltage regulator from the coefficients of the system transfer function by comparing a closed loop transfer function formed of a controller transfer function of the voltage regulator and the system transfer function with a desired closed loop transfer function.

2. The method of claim 1, wherein in the regression analysis with instrumental variables, the coefficients of the system transfer function are recursively determined by:

calculating an actual step excitation signal by filtering the previous step excitation signal with a denominator of the system transfer function with actual step coefficients;

calculating an actual step terminal voltage by filtering a previous step terminal voltage with the denominator of the system transfer function with the actual step coefficients;

calculating an actual step response by filtering the first time series of measurement values of the excitation signal with the system transfer function with actual step coefficients; and determining next step coefficients by minimizing a difference between a $n^{th}$ derivative of the actual step terminal voltage and a product of a coefficient vector and an instrumental variable vector, wherein n is the order of denominator of the system transfer function, and wherein the coefficient vector is formed of the next step coefficients, and the instrumental variable vector is formed from derivatives of the actual step response and the actual step excitation signal.

3. The method of claim 1, further comprising:

forming an initial step excitation signal by filtering the first time series of measurement values of the excitation signal with a high pass filter; and forming an initial step terminal voltage by filtering the second time series of measurement values of the terminal voltage with the high pass filter.

4. The method of claim 1, further comprising:

determining initial step coefficients for the system transfer function by minimizing a $n^{th}$ derivative of an initial step terminal voltage and a product of a coefficient vector and a regression vector, wherein the coefficient vector is formed of the initial step coefficients, and the regression vector is formed from derivatives of the initial step terminal voltage and an initial step excitation signal.

5. The method of claim 1,
wherein the closed loop transfer function is determined from a product of the controller transfer function and the system transfer function; and/or
wherein the desired closed loop transfer function is a second order transfer function with a desired settling time and/or a desired overshoot.

6. The method of claim 1,
wherein the controller transfer function is a transfer function of a PID controller; and
wherein the control parameters set factors for a proportional controller part, an integral control part, and a differential controller part.

7. The method of claim 1,
wherein a desired steady state error is set by comparing the closed loop transfer function and the controller transfer function.

8. The method of claim 1,
wherein the controller transfer function is a transfer function of a lead-lag controller.

9. The method of claim 1, further comprising:
generating a voltage to be applied to the rotor windings by generating the first time series of values of the excitation signal and applying the first time series to the synchronous machine; and
measuring the second time series of the terminal voltage.

10. The method of claim 1,
wherein the control parameters are determined during a commissioning of the synchronous machine; and/or
wherein the control parameters are determined periodically during a continuous operation of the synchronous machine.

11. A method for controlling a synchronous machine, the method comprising:
determining control parameters according to the method of claim 1;
applying the determined control parameters to the voltage regulator of the synchronous machine; and
controlling the synchronous machine with the voltage regulator.

12. A computer program for determining control parameters for a voltage regulator, wherein, when being executed on a processor, the computer program is adapted for performing the method of claim 1.

13. A non-transitory computer readable medium for determining control parameters for a voltage regulator, wherein the computer program according to claim 12 is stored on the non-transitory computer readable medium.

14. A controller of a voltage regulator of an synchronous machine, wherein the controller is adapted for performing the method of claim 1.

15. A synchronous machine system, comprising:
a synchronous machine with a stator having stator windings connected via terminals to an electrical grid, and a rotor having rotor windings, wherein the rotor is rotatably mounted in the stator; and
a voltage regulator for supplying a voltage to the rotor windings;
wherein the voltage regulator comprises an electrical converter, wherein the voltage regulator is adapted for generating the voltage for the rotor windings; and
wherein the voltage regulator comprises a controller for controlling the converter and for performing the method of claim 1.

* * * * *